United States Patent [19]

Williams et al.

[11] Patent Number: 5,560,624

[45] Date of Patent: Oct. 1, 1996

[54] DISK CLAMPING COLLET SYSTEM

[75] Inventors: Roger O. Williams, Fremont; Jon Hoshizaki, Cupertino; Kevin C. Hursh, San Jose, all of Calif.

[73] Assignee: Exclusive Design Company, Fremont, Calif.

[21] Appl. No.: 300,277

[22] Filed: Sep. 2, 1994

[51] Int. Cl.⁶ ........................................ B23B 31/40
[52] U.S. Cl. .................. 279/2.03; 118/503; 269/48.1; 427/128; 451/63; 451/307; 279/50
[58] Field of Search ..................... 279/2.02–2.04, 279/2.1–2.12, 2.21, 50, 157, 51, 4.07–4.09; 269/48.1; 360/86, 98.08, 99.05, 99.12; 369/261, 270, 271; 409/233; 82/153, 155, 169; 451/63, 209, 307; 427/127–132; 118/500, 503

[56] References Cited

U.S. PATENT DOCUMENTS

| | | | |
|---|---|---|---|
| 2,850,287 | 9/1958 | Jackson | 279/2.03 |
| 2,929,635 | 3/1960 | Czerenda | 279/2.03 |
| 3,143,356 | 8/1964 | Pray | 279/51 |
| 3,361,433 | 1/1968 | Holdridge | 279/51 |
| 3,868,886 | 3/1975 | Bondie | 409/233 |
| 4,403,319 | 9/1983 | Adamek et al. | 360/99.05 |
| 4,408,318 | 10/1983 | Sugiura | 369/261 |
| 4,705,279 | 11/1987 | Mizukami et al. | 369/261 |
| 4,755,981 | 7/1988 | Ekhoff | 369/270 |
| 5,275,424 | 1/1994 | Watanabe | 279/50 |

FOREIGN PATENT DOCUMENTS 362292305 1/1987 Japan ...................... 279/157

*Primary Examiner*—Steven C. Bishop
*Attorney, Agent, or Firm*—Pennie & Edmonds

[57] ABSTRACT

A collet system for mounting, holding, and rotating a rigid disk substrate is described, the collet system including a collet and an expander, the collet having a base portion and fingers longitudinally extending therefrom. The inner surface of the disk is clamped by the radially expanding fingers at a location which is not coplanar with any locus of expansion contact points between the collet fingers and the expander. The outward radial force exerted on the inner disk surface is thereby determined by a cantilever spring tension experienced by the fingers, thus producing a highly consistent, repeatable force which is robust against small frictional variations in the environment and against small variations in inner diameters among disks. Inward axial movement of the expander into the collet is abuttably stopped at a predetermined offset for increased robustness, tolerance, and repeatability of results.

44 Claims, 11 Drawing Sheets

FIG. 10A FREE STATE

FIG. 10B EXPANDED COLLET – NO DISK

FIG. 10C EXPANDED COLLET – DISK ON COLLET

DISK CLAMPING COLLET SYSTEM

FIELD OF THE INVENTION

The present invention relates to the field of electromechanical systems and processes for mechanically affecting the surfaces of disks. Specifically, the present invention relates to an apparatus for clamping, mounting, holding, and rotating a disk during the disk texturizing, burnishing and buffing processes.

BACKGROUND OF THE INVENTION

In present day computing systems a high demand has emerged for increased data storage capability in physically lighter and smaller mass memory storage devices. Magnetic media disk memories have necessarily become lighter and smaller, while at the same time becoming capable of storing more data than their physically larger predecessors.

In general, disk memories are characterized by the use of one or more magnetic media disks stacked on a spindle assembly and rotated at a high rate of speed. As requirements have emerged for these magnetic disks to be capable of more storage with less size and weight, the spacings and tolerances involved in disk recording systems have become exceedingly minute. As a result, the most important properties needed in advanced magnetic media disk memories are now generally of a mechanical nature.

The mechanical texturizing process of the surfaces of the disks, performed during disk manufacture, has become an increasingly delicate and exacting process. Most texturizing equipment utilizes an abrasive material, such as silicon carbide or aluminum oxide, for cutting small grooves in the disk, which is commonly made of aluminum. The material is typically bonded to a mylar-backed tape which is then passed over a cylindrical load roller. The tape is mechanically forced against the surface of the disk by the load roller. Commonly, two load roller assemblies are positioned side by side to texture the front and back surfaces simultaneously. To facilitate the texturizing process, the rigid-disk substrate is often rotated against the tape/roller system at a high rate of speed.

Assemblies which repetitively mount, hold, and rotate the rigid-disk substrates typically comprise a robot arm and a collet system. The robot arm seizes an untexturized disk from a disk source and positions the inner surface of the disk over the closed fingers of the collet system. An expander arm is then axially forced against the inside of the collet fingers, causing them to open and to thereby radially clamp the inner surface of the disk.

The disk is held in place as a result of the radial pressure exerted by the outer surfaces of the collet fingers against the disk's inner surface. This radial pressure, together with the resultant static friction at the contact points between the collet fingers and the inner surface of the disk, holds the disk in place while being rotated for texturization. This holding/rotating force overcomes the kinetic friction between the disk surface and the texturizing tape, which resists the rotation. This kinetic friction is a function of the (1) kinetic friction coefficient between the texturizing tape and the disk surface, and (2) the orthogonal force of the tape against the disk surface, which is typically about 5 pounds for a 3.5" disk, exerted simultaneously on the front and back sides of the disk.

After texturization, the expander arm is axially released, closing the collet fingers to allow removal of the finished disk and mounting of the next disk for texturizing.

Due to the ever-present demand for smaller and lighter storage units, the thicknesses of the rigid disk substrates have decreased. For example, whereas a 3.5" diameter, 500MB disk used to have a thickness of about 0.050", a disk with the same diameter and capacity is now typically less than 0.025" thick. These disks, however, need at least the same degree of precision texturizing and flatness as their thicker predecessors and therefore must be subject to the mechanical texturizing process described above.

Problems have arisen regarding the collet systems which mount, hold, and rotate the increasingly thin disk substrates. These problems have arisen in light of the following: (1) the thinner disks are less rigid and are therefore subject to significant warpage if there is sufficient clamping force exerted against their inner circumferences, (2) among a sample of disk substrates, there will be small but crucial variations in the inner diameter of the disks, and (3) these variations may result in less surface area along a given disk's inner circumference to which the collet can radially clamp. Current collet systems have deficiencies in light of the above problems brought on or exacerbated by the increasing thinness of the disks, deficiencies which will be described with reference to a typical prior art system.

FIG. 1 diagrams a disk clamping collet system 100 according to the prior art. Disk clamping collet system 100 comprises a collet 102, an expander 104, a draw bar 106, a spindle 108, and a spring means 110.

Collet 102 comprises a base 112 and fingers 114a, 114b, 114c, 114d, 114e, and 114f. Each of fingers 114a–f is a radially curved cantilever extending longitudinally from the base 112 and is integral with the base 112. Each of fingers 114a–f is radially curved around the axis of rotation of the collet system 100, this axis being designated the z-axis in FIG. 1. Each of the fingers 114a–f is curved approximately 60 degrees around the z-axis and is separated from its neighboring fingers by a radially oriented slot running along the z-axis. While the collet 102 in FIG. 1 has six fingers 114a–f, in general there may be N fingers, in which case the arc covered by each finger around the z-axis will be approximately 360/N degrees. Fingers 114a–f are substantially identical to each other. Collectively when viewed as a whole, fingers 114a–f form a finger portion 116 of collet 102.

Finger 114a of collet 102 comprises an expansion portion 118a formed therein by a surface which slopes inwardly toward the base 112 and z-axis, as shown in FIG. 1. Fingers 114b–f likewise comprise expansion portions 118b–f, respectively. Collectively when viewed as a whole, expansion portions 118a–f form an expansion portion 120 of collet 102.

Finger 114a of collet 102 further comprises a disk contact ring segment 122a formed thereon by a raised surface, the longitudinal dimension of which corresponds generally to the thickness of the disk to be mounted. Fingers 114b–f likewise comprise disk contact ring segments 122b–f, respectively. Collectively when viewed as a whole, disk contact ring segments 122b–f form a disk contact ring 124 of collet 122.

Disk clamping collet system 100 also comprises an expander 104. Expander 104 lies at least partially within a hollowed portion of the collet 102 formed by the longitudinally extending fingers 114a–f and comprises an expansion surface 126. Expansion surface 126 has a conical shape which generally forms a counterpart to the conical shape of the expansion portion 120 of collet 102. When expander 104 is urged in an axial direction toward the base 112 of collet 102, contact is made between the expansion surface 126 and the expanding portion 120 such that fingers 114a–f are each urged radially outward in a cantilever fashion. Disk contact ring 124 thus obtains a larger diameter and comes into contact with the inner circumference of the disk, thereby holding the disk in place.

Disk clamping collet system 100 further comprises a draw bar 106 which is axially affixed to expander 104 such that expander 104 is moved axially in response to movement of the draw bar 106. Disk clamping collet system 100 further comprises a spindle 108 which lies stationary with respect to the z-axis of FIG. 1, while collet 102 is axially affixed with respect to spindle 108. In this way, draw bar 106 and expander 104 are axially moved along the z-axis while collet 102 and spindle 108 are stationary along the z-axis of FIG. 1. The entire system 100 rotates around the z-axis.

Draw bar 106 comprises an abutting end 128, as shown in FIG. 1, wherein spring means 110 is positioned between abutting end 128 and spindle 108. In the prior art device of FIG. 1, spring means 110 comprises a stack of belville springs having a high spring constant and small displacement range. Spring means 110 urges abutting end 128 of draw bar 106 away from spindle 108, which in turn urges expansion surface 126 of expander 104 into contact with expansion portion 120 of collet 102.

In operation, during disk unloading/loading, abutting end 128 of draw bar 106 is forced toward spindle 108 by an external means such as an air cylinder assembly (not shown). Expander 104 thus moves outward with respect to collet base 112, reducing the outward radial pressure exerted by expansion surface 126 on expansion portion 120, and in turn reducing the outward radial force exerted by disk contact ring 124 on the mounted disk. The disk can then be removed and another disk positioned over the disk contact ring 124. After this step, the external force on abutting end 128 is released and the new disk thereby clamped into place by (1) operation of the spring means 128 against draw bar 106, causing (2) outward radial pressure of expansion surface 126 against expansion portion 120, causing (3) disk contact ring 124 to expand outwardly against the inner surface of the disk.

The range of motion of the draw bar 106 and expander 104 with respect to the collet 102, known as the "stroke length" of the collet system, is quite small, equalling only about 1/32 of an inch in a typical system according to the prior art as shown in FIG. 1.

Problems have arisen with the prior art system according to FIG. 1 due to the decreasing thickness of the disk substrates. When thick disks are mounted onto disk contact ring 124, fluctuations from disk to disk in the radial force exerted by disk contact ring 124 are not as significant because the thicker disks are capable of maintaining their shape even when this force exceeds nominal parameters. However, thinner disks will tend to warp as a function of the asymmetrical outward radial pressure. The degree of warpage depends on the magnitude of the radial pressure. At the same time, however, the thinner disks need just as much rotational holding power as the thicker disks because the texturizing force exerted on the disk's front and back surfaces remains generally the same. A greater outward pressure is thus needed on the inner circumference of the disk because the area along the inner circumference is smaller because the disk is thinner.

Because of these constraints, it is desirable to clamp the inner circumferences of the disks with symmetrical clamping forces which are high but which do not exceed parameters beyond which the disk will warp excessively. Such characteristics will be increasingly crucial as disk thicknesses continue to decrease. It is thus desirable that a disk clamping collet system be able to exert a highly repeatable outward force on the inner circumference of successively mounted disks. It is further desirable to make this force more tolerant to variations in the inner diameters of the successive disks.

The prior art disk clamping collet systems are deficient with respect to these desired criteria, as is shown graphically in FIG. 2. FIG. 2 plots the outward force $F_{out}$ exerted by one of the fingers 114a–f (e.g., finger 114a) against a portion of the inner circumference of a disk which has been placed over disk contacting ring 124. This force $F_{out}$, shown on the vertical axis, is plotted against the axial displacement x of draw bar 106 with respect to the spindle 108, and therefore which also represents the axial displacement of expander 104 with respect to collet 102, as shown in FIG. 1.

As shown in FIG. 2, when displacement x is below a nominal clamping displacement $x_o$, there is no contact between the disk contact ring segments 122a–f of fingers 114a–f and the disk. As x is increased, i.e. as the draw bar 106 is further urged outward by the spring means 110, thereby urging expander 104 further into collet 102, there is finally contact as the fingers 114a–f meet the disk at the nominal clamping displacement $x_o$. At this nominal clamping displacement $x_o$, the force $F_{out}$ against the disk is at its nominal operating level $F_{out,o}$. If the distance x is increased beyond this point, however, the force $F_{out}$ increases dramatically, and thus a slight translation of the expander 104 at this operating point will easily cause forces which will result in warpage or buckling of the disk, which is undesired.

This high sensitivity to axial translation of the expander 104 is exacerbated by another problem: the discontinuous relationship between the displacement x and the axial spring force exerted by the spring means 110 when x is near the operating point $x_o$. This brought about by friction problems which exist at the contact points between the expansion surface 126 and the expansion portion 120 and changes in the inner diameter of the disk due to manufacturing tolerances. Near the operating point $x_o$, the nature of the contact achieved between the expansion surface 126 and the expansion portion 120 tends to vary back and forth between a static and a kinetic relationship, with the friction coefficient experiencing accordingly erratic behavior. As a result, there is a discontinuous, highly nonrepeatable cause-and-effect relationship between the axial spring force exerted by spring means 110 and the displacement x resulting therefrom.

The variations among the static and kinetic friction coefficients is accompanied by the further problem of an abundance of abrasive elements which exist in free floating form in the texturizing environment as a result of, for example, the abrasive materials becoming dislocated from the mylar-backed abrasive tape during the texturizing process. These abrasives can accumulate on surfaces and cause changes in both static and kinetic friction coefficients among the various parts of the disk clamping collet system 100, including the expansion surface 126 and the expansion portion 120.

A further disadvantage associated with the prior art disk clamping collet systems is their extreme sensitivity to variations among different expanders 104. As illustrated in FIG. 3, an exploded view of expansion surface 126 and expansion 120 of collet 102 is shown. As described above, expansion surface 126 has a conical shape which cooperates with the conical shape of the expansion potion 120 of collet 102. Because of manufacturing tolerances, the slope of the expansion surface 126 tends to vary slightly among different expanders 104. A slight variation in the slope of expansion surface 126 greatly affects the point of contact x between the expansion surface 126 and the expansion portion 120. As discussed above in connection with FIG. 2, translation of x from the nominal clamping displacement $x_o$ will cause forces which will result in excessive warpage or buckling of the disk. Therefore, these clamping systems are highly sensitive to replacement of one expander for another expander, thereby adversely affecting repeatability.

Thus, there exists in the prior art system the problems of (1) high sensitivity of the outward radial force exerted by the collet fingers on the disk to small axial displacement changes of the expander, and (2) a discontinuous, nonrepeatable relationship between the axial displacement of the expander and the axial spring force exerted thereon. The result of these deficiencies is that the clamping force exerted on a mounted disk is inconsistent and non-repeatable. As disks get thinner, it will be desirable to achieve more exacting, repeatable outward pressures which sufficiently clamp but do not warp the disk, and therefore systems according to the prior art of FIG. 1 are insufficient.

FIG. 4 shows one prior art attempt to solve to problems of the disk clamping collet system of FIG. 1. The modified system of FIG. 4 employs a mechanical outer-limit stopping means to prevent over-expansion of the disk contact ring 124, in the form of a collar 360 fitted over the collet 102. The collar 360 prevents the outward expansion of disk contact ring 124 beyond a certain point and thus will normally prevent warpage of the disk.

However, the disk clamping collet system of FIG. 4 has a drawback in that small fluctuations in the inner diameter of the disk among a sample of disks will cause serious problems, especially where the disk has a slightly larger inside diameter than normal. In the case of a larger-than-normal inside diameter disk, the collar 360 will prevent the collet 102 from expanding outwardly to a sufficient clamping diameter, causing the disk to slip during texturizing due to insufficient clamping force. When the disk is slightly smaller than normal, the collar 360 will prevent the collet 102 from expanding beyond a certain point. However, this stopping point may be beyond a point where the disk has already warped. Thus, the prior art device as shown in FIG. 4 is intolerant to variations in the inner diameters of successive disks.

It is an therefore an object of the present invention to provide an improved disk clamping collet system which provides for a more constant, repeatable outward radial force on a mounted disk during the disk texturizing process.

It is a further object of the present invention to provide a disk clamping collet system which is more tolerant to variations in inner disk diameters among a sample of nominally identical disks.

It is yet another object of the invention to provide a disk clamping collet system which is more tolerant to the presence of free floating abrasives in the disk texturizing environment.

It is still another object of the invention to provide for greater coupling force to rotate a mounted disk against the resistance of the texturizing abrasives, while avoiding warpage of the disk due to excessive outward radial forces on its inner circumference.

It is still another object of the present invention to provide for an improved disk clamping collet system which allows easier mounting of the disk by allowing for a greater margin of error in the centering of the disk as the disk is mounted by an external positioning mechanism.

SUMMARY OF THE INVENTION

These and other objects of the present invention are provided for by an improved disk clamping collet system for mounting, holding, and rotating rigid-disk substrates in a computer disk surface texturizing system.

A disk clamping collet system in accordance with the present invention comprises an expanding collet having a base and fingers extending longitudinally therefrom. The expanding collet also includes a disk contact ring segmented to form a group of fingers for radially contacting an inner surface of the disk. The disk clamping collet system further comprises an expander for forcibly urging the fingers to radially expand such that the disk contact ring radially contacts the inner surface of the disk. The expander of the disk clamping collet system according to the present invention preferably comprises a annular convexly curved surface.

In the present invention, the disk contact ring is offset from the radial expansion contact locus. As a result, the outward radial pressure exerted on the inner surface of the disk will depend upon a cantilever spring force experienced by the fingers. Such a system is more tolerant of frictional discontinuities and variations at the radial expansion contact locus between the expander and the fingers.

More specifically, the disk contact ring is positioned in a plane which is different from any plane which is defined by any radial expansion contact locus between the expander and the collet. Additionally, the plane of the disk contact ring lies a first distance from the base, and the radial expansion contact locus plane lies a second distance from said base, wherein the first distance is greater than the second distance. In such a configuration, the fingers will experience cantilever deflection forces due to contact points at (1) the base, (2) the radial expansion contact locus with the expander, and (3) the inner surface of the disk.

It has been found that such a collet system provides for a constant and repeatable outward radial force on a mounted disk during the disk texturizing process. Moreover, a disk clamping collet system according to the present invention is more tolerant to variations in inner disk diameters among samples of nominally identical disks, and is more tolerant to the presence of free floating abrasives in the disk texturizing environment.

A disk clamping collet system according to the present invention further includes means for engaging the disks at a predetermined nominal axial biasing position relative to a fixed position rather than a spring constant as in the prior art system. Such a system comprises means (usually a coil spring) for axially urging the expander toward the collet base and means, fixably coupled to the collet base in the axial direction, for abuttably stopping the expander at a predetermined nominal axial biasing position relative to the collet base. The expander is axially moved toward the collet base by the axially urging means. As a result, the disk contact ring contacts the inner surface of the disk. The outward radial pressure is increased on the disk inner surface until the expander reaches this predetermined nominal axial biasing position. Since the expander is then abuttably prevented from further movement into the collet by the means for abuttably stopping, the outward pressure on the inner surface of the disk is prevented from increasing further. In such a way, warpage of the disk as well as damage to the collet due to over-expansion is prevented.

In a disk clamping collet system according to the present invention, the sensitivity of the outward radial force to small variations in the axial position of the expander is reduced because of the tolerant non-linear relationship between the cantilever spring forces experienced by the collet fingers and the axial translation of the expander. Furthermore, in the preferred embodiment of the invention, the inward axial force exerted on the expander by the means for axially urging is designed to be greater than an opposite axial force on the expander by the collet fingers when the expander is near the predetermined nominal axial biasing position. As a result, when a disk is mounted, the expander will be strongly urged against the means for abuttably stopping, and the axial position of the expander will thereby be more precisely fixed.

A disk clamping collet system in accordance with the present invention further comprises a means for adjusting the predetermined nominal axial biasing position of the expander relative to the collet base. This feature facilitates clamping disks of different sizes and adjusting rotational torque to disk thicknesses, aging of system components, manufacturing tolerances, etc.

The above characteristics make the outward pressure exerted by the disk contact ring more constant and repeatable. Because of the cantilever spring action and the convexly curved expansion surface, the disk clamping collet system according to the present invention is highly robust against small variations in the position of the expander relative to the collet at the predetermined biased axial position. Small changes in the relative position will not cause dramatic changes in the outward force on the disk. Additionally, the outward radial force is highly predictable and repeatable, even among disks with small variations in inner disk diameter. Because of the non-linear and relative insensitivity to slight changes in axial positioning, the disk clamping collet system of the present invention is more resistant to free floating abrasives in the environment which promote discontinuous and non-repeatable relationships between the axial positioning means and the opposite axial force exerted on the expander means by the collet.

In a further embodiment of the present invention, the disk contact ring comprises a surface which is raised with respect to the remaining exterior of the extending portion of the collet. In another embodiment of the invention the disk contact ring comprises a textured surface on its outer diameter, this textured surface being formed with grooves which run substantially parallel to the axis of rotation. This increases the coefficient of friction between the disk contacting ring segments and the inside dimension of the processed disk.

In another embodiment of the present invention the disk contact ring has a bevelled surface, the bevelled surface sloping inward toward the base of the collet. This downward slope of the disk contact ring compensates for the cantilever-like bending of the collet finger so as to maximize the surface area of contact between the disk contact ring and the disk, thereby maximizing the frictional contact between the disk contact ring and the disk.

BRIEF DESCRIPTION OF THE DRAWINGS

The above mentioned objects and other objects, features, and advantages of the invention may be better understood by referring to the following detailed description, which should be read in conjunction with the accompanying drawings in which:

FIGS. 10(a–c) are an exaggerated diagram showing the cantilever behavior experienced by a collet finger in a disk clamping collet system according to the present invention;

DETAILED DESCRIPTION OF THE INVENTION

Figure 5:
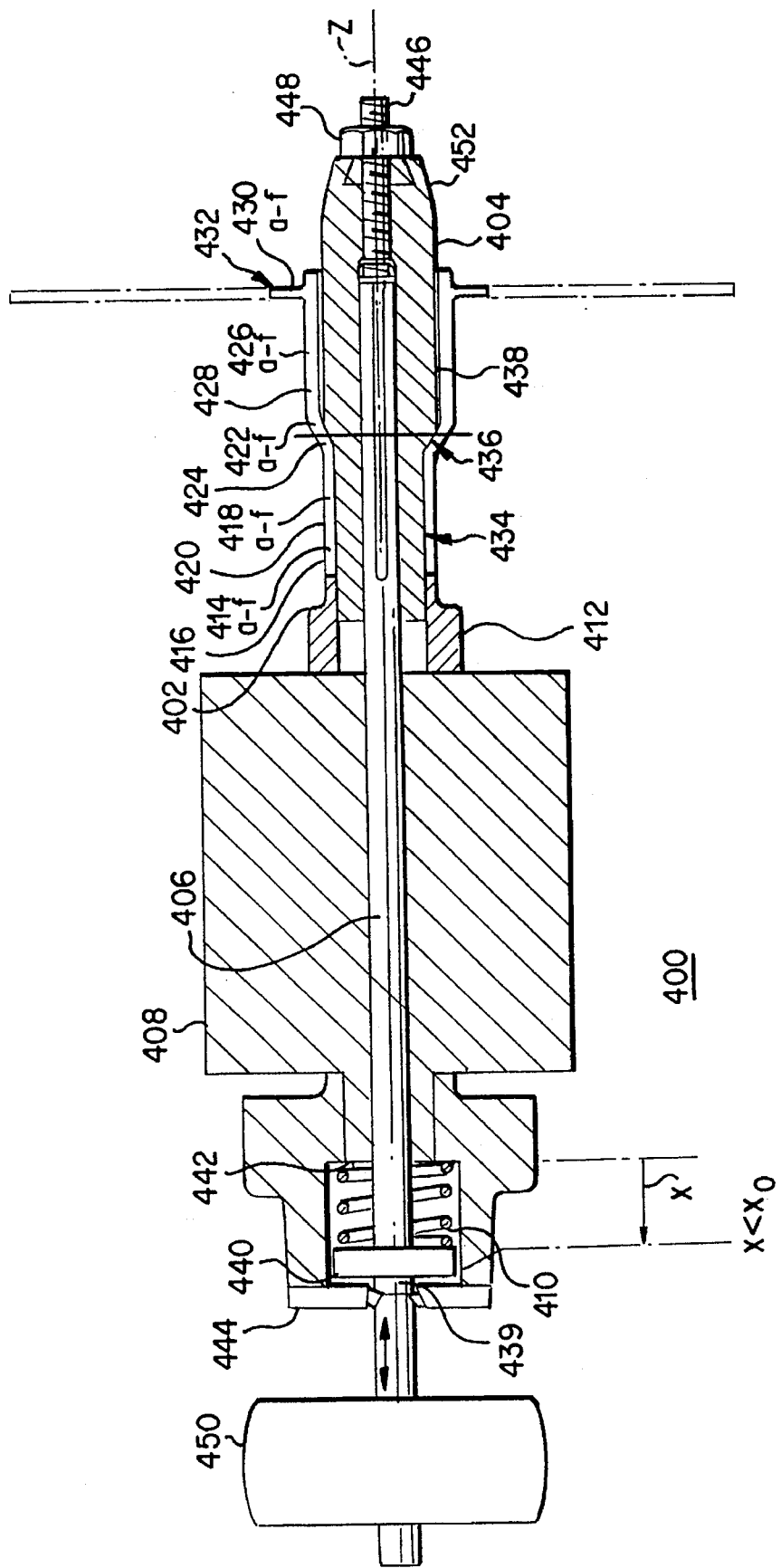
FIG. 5 is a cross sectional illustration of a disk clamping collet system according to a first embodiment of the present invention, the collet fingers of the disk clamping collet system being in an unexpanded state.
Figure 6:
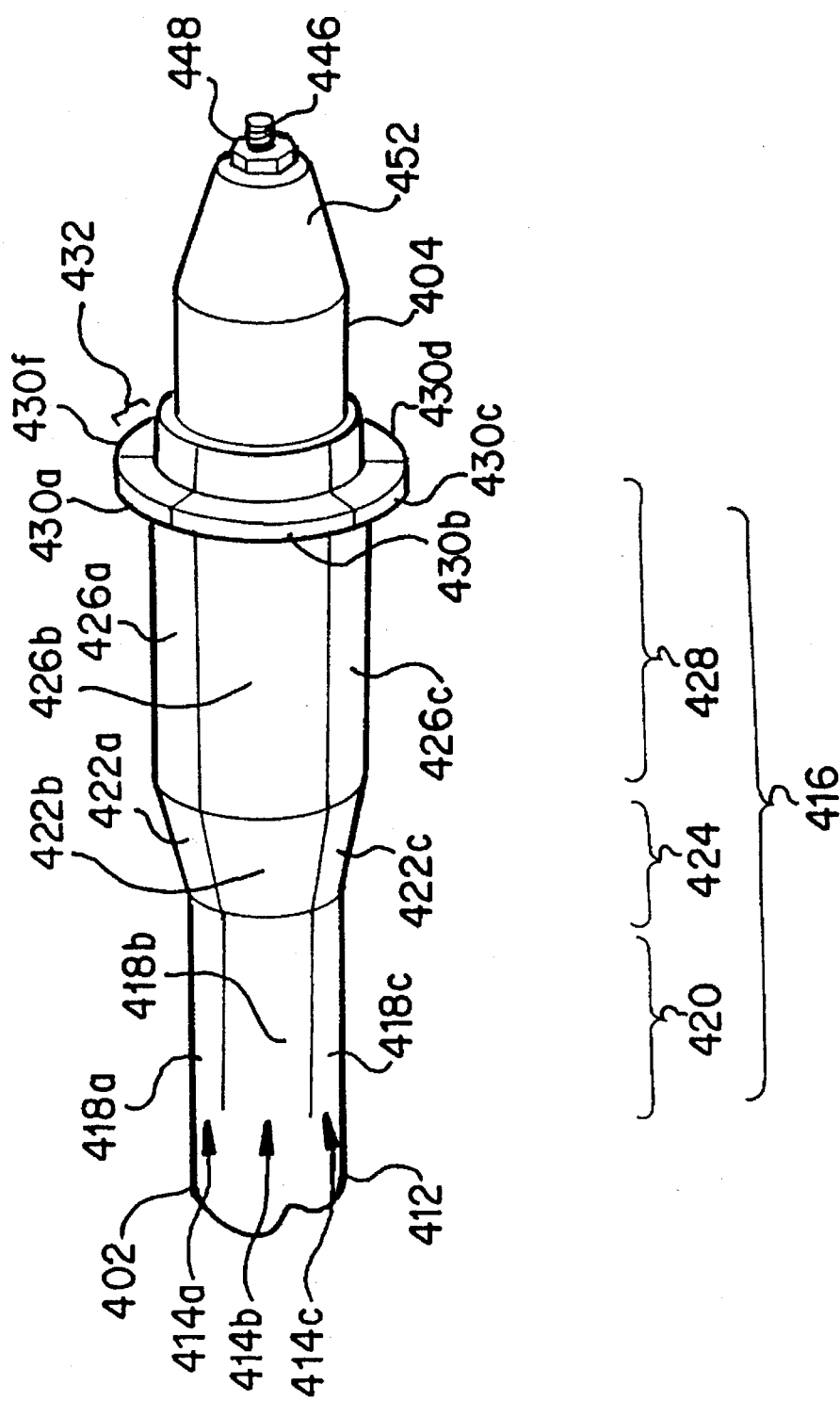
FIG. 6 is an oblique view of the collet portion of the disk clamping collet system of FIG. 5.
Figure 7:
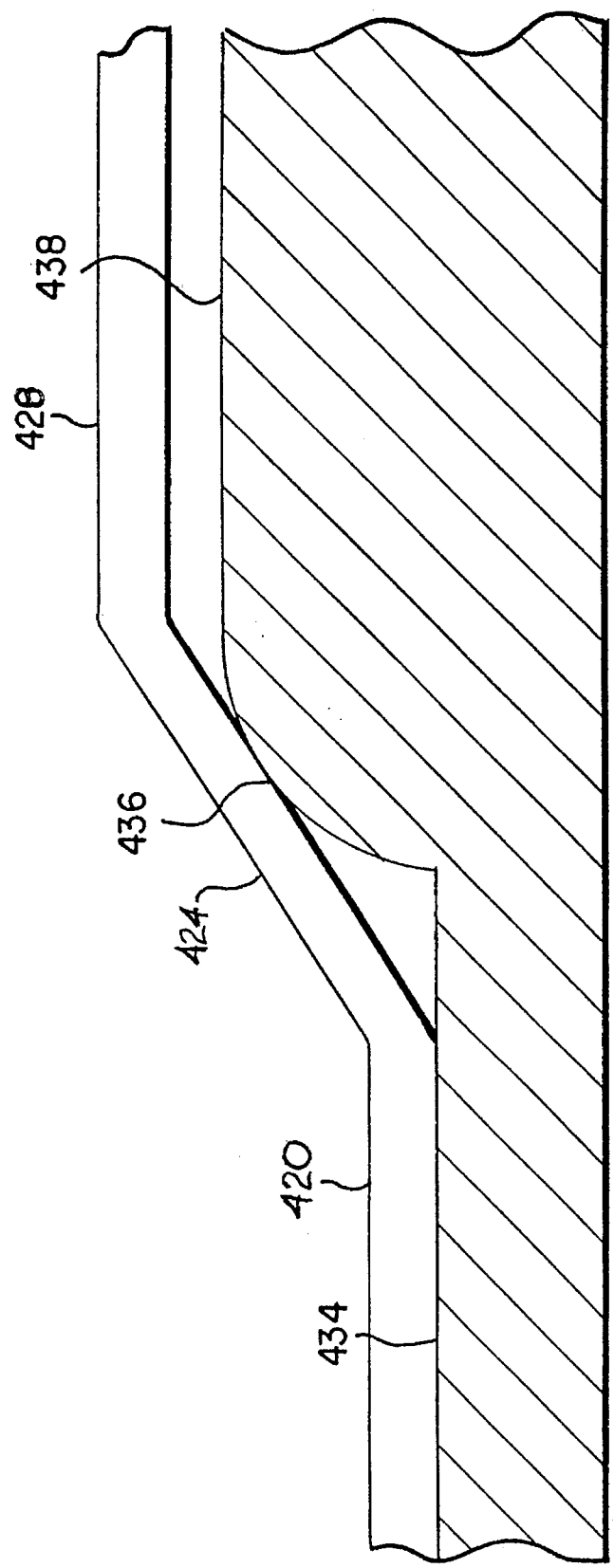
FIG. 7 is an exploded view of the radial expansion contact locus in a disk clamping collet system according to the present invention.

FIGS. 5–8 diagram an improved disk clamping collet system 400 according to a first embodiment of the present invention. Collet 400 comprises a collet 402, an expander 404, a draw bar 406, a spindle 408, and a coiled spring 410. FIG. 6 illustrates an oblique view of the outside of collet 402 and expander 404.

Collet 402 comprises a base 412 and fingers 414a, 414b, 414c, 414d, 414e, 414f. Each of the fingers 414a–f is a radially curved cantilever extending longitudinally from the base 412 and is integral therewith. Each of fingers 414a–f is radially curved around the axis of rotation of the collet 400, this axis being designated the z-axis in FIG. 5. Each of fingers 414a–f is curved approximately sixty degrees around the z-axis and is separated from its neighboring fingers by radially oriented slots running along the z-axis. While the collet 402 in FIG. 5 has six fingers 414a–f, in general there maybe N fingers, in which case the arc covered by each finger around the z-axis will be approximately 360/N degrees. (For example, a collet with twelve fingers, each curved 30 degrees around the z-axis, has proven to be an effective design.) Fingers 414a–f are substantially identical to each other. Collectively when viewed as a whole, fingers 414a–f form a finger portion 416 of collet 402.

Finger 414a of collet 402 comprises a finger base portion 418a which, as shown in FIGS. 5 and 6, is that portion of finger 414a which attaches to the collet base 412. In a like manner, fingers 414b–f further comprise finger base portions 418b–f, respectively. Collectively when viewed as a whole, finger base portions 418a–f form a finger base 420 of finger portion 416 of collet 402.

Finger 414a of collet 402 further comprises an expansion portion 422a formed therein by an inner surface which slopes inwardly toward the base 412, as shown in FIGS. 5 and 6. Fingers 414b–f likewise comprise expansion portions 422b–f, respectively. Each of the expansion portions 422a–f comprise a surface which is at an angle with respect to the z-axis. Collectively when viewed as a whole, expansion portions 422a–f form an expansion portion 424 of finger portion 416 of collet 402.

Finger 414a of collet 402 further comprises an extension portion 426a, as shown in FIGS. 5 and 6. Extension portion 426a is that portion of finger 414a which primarily experiences a cantilever spring force when a disk is mounted and the collet is expanded. Fingers 414b–f likewise comprise extension portions 426b–f, respectively. Collectively when viewed as a whole, extension portions 426a–f form an extension portion 428 of finger portion 416 of collet 402.

Finger 414a of collet 402 further comprises a disk contact ring segment 430a, as shown in FIGS. 5 and 6. Disk contact ring segment 430a is that portion of finger 414a which contacts the inner surface of a mounted disk. Fingers 414b–f likewise comprise disk contact ring segments 430b–f, respectively. Collectively when viewed as a whole, disk contact ring segments 430a–f form a disk contact ring 432 of finger portion 416 of collet 402.

Disk contact ring segments 430a–f are integral with and formed in or on the extension portions 426a–f, respectively. It is noted that the term "disk contact ring segment" is not limited to a feature of fingers 414a–f which is necessarily raised with respect to an adjacent area. A disk contact ring segment is that portion of a finger which contacts the inner surface of a mounted disk. While in FIG. 5 the disk contact ring segments 430a–f are shown raised with respect to extension portions 426a–f, the scope of the term "disk contact ring segments" is not so limited. Fingers 414a–f, for example, may be perfectly "flat" over the length of extension portions 426a–f, in which case the disk contact ring segments 430a–f will just be the predetermined areas thereon which contact the inner surface of the mounted disk. It may be even be desirable to have the disk contact ring segments be "depressions" within the fingers which will form the contact with the mounted disk.

It is further noted that, while in the present embodiment of the invention the disk contact ring 432 is formed collectively by the disk contact ring segments 430a–f which are of substantially the same shape, it is within the scope of the present invention for disk contact ring segments 430a–f to be differently or irregularly shaped, but wherein their collective action will be to interface with the inner surface of a mounted disk to facilitate the rotation thereof.

Each of the fingers 414a–f has a free end opposite the base 412 of collet 402, which represents the outermost point of the fingers 414a–f from the base. The cantilever action of fingers 414a–f occurs between the base 412 and the free ends of the fingers.

It is noted that among the inventive characteristics and features of the present invention, extension portion 428 is associated with that feature which allows the outward radial force exerted by the disk contact ring 432 on the inner surface of a mounted disk to depend on a cantilever spring force.

Figure 3A:
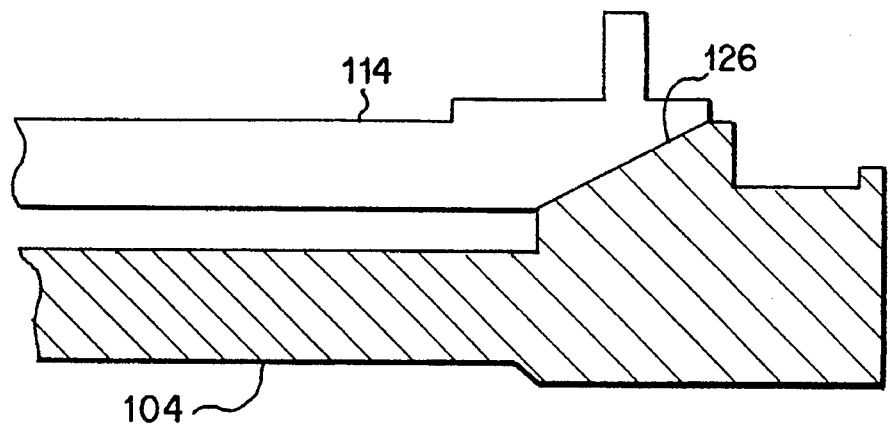
FIGS. 3(a–c) are an exploded view of the radial expansion contact locus in a disk clamping collet system according to the prior art.
Figure 3B:
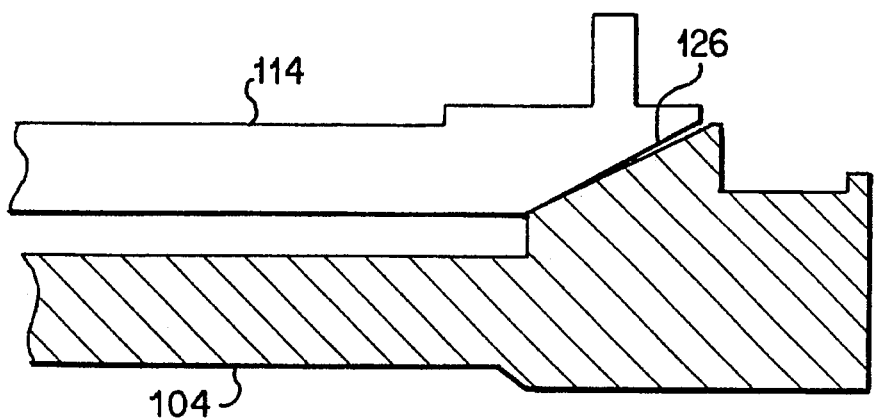
Figure 3C:
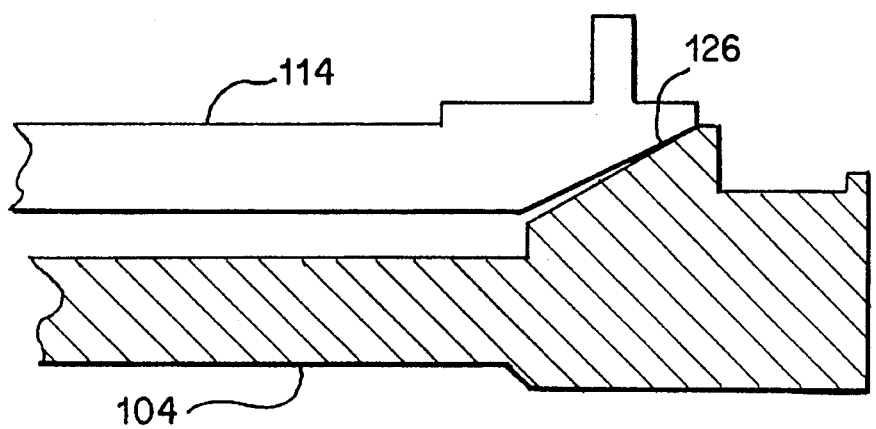

As shown in FIG. 5, expander 404 of disk clamping collet system 400 is positioned at least partially within a hollowed portion of the collet 402 formed by the longitudinally extending fingers 414a–f. As shown in the exploded view of expander 404 in FIG. 7, expander 404 comprises a narrow portion 434, an convex expansion surface 436, and a wide portion 438. Convex expansion surface 436 has a annular convexly curved shape which generally forms a counterpart to and cooperates with the inner surface of the expansion portion 424 of collet 402. Advantageously, when viewed in cross-section convex the expansion surface 436 contacts expansion portion 424 at one point, i.e., the point at which the expansion portion 424 forms a tangent to convex expansion surface 436. This is contrasted with the problem identified in connection with the expansion cone of the prior art shown in FIG. 3. As a result, variations in the shape of the convex expansion surface 436 have minimal impact on the operating characteristics of the disk clamping collet system of the present invention. When expander 404 is urged in an axial direction toward the base 412 of collet 402, contact is made between the convex expansion surface 436 and the collet expansion portion 424 such that fingers 414a–f are collectively urged radially outward in a cantilever spring fashion. Disk contact ring 432 thus repositions to a larger diameter and comes into contact with the inner surface of the mounted disk, thereby holding the mounted disk in place.

When the mounted disk is in place, fingers 414a–f operate in a cantilever fashion which is now described. For simplicity, only finger 414a will be described and the other fingers 414b–f operate in a collectively similar fashion. Finger 414a is deflected among three contact points when the disk clamping collet system 400 is in operation and a disk is mounted.

The first contact point is the base 412 of the collet 402 to which finger base 418a of finger 414a is affixed. The second contact point is a locus of contact points between the convex expansion surface 436 and the expansion portion 422a of finger 414a. This locus of contact points is part of a "radial expansion contact locus" formed between collet 402 and expander 404. The "radial expansion contact locus" is the set of contact points between expander 404 and collet 402 which urges fingers 414a–f, or any selected combination thereof, to expand outward. In the presently described embodiment of the invention, the radial expansion contact locus is formed between the convex expansion surface 436 of expander 404 and the expansion portion 424 of collet 402. Due to the generally segmented circular symmetry of the fingers 414a–f and the expander 404, the radial expansion contact locus will generally be of a circular shape around the z-axis, or of an annular cone-like ring shape around the z-axis, depending on the configuration and shape of the convex expansion surface 436 in light of the configuration and spherical shape of the expansion portion 424. Considering finger 414a to be the upper finger diagrammed in FIG. 5, the force exerted by convex expansion surface 436 on the disk collet finger 414a is in the upward, i.e. radially outward direction.

The third contact point acting on finger 414a is the downward, i.e. radially inward, force exerted on the outer surface of the collet disk contact ring segment 430a by the inner surface of the mounted disk.

The disk clamping collet system 400 further comprises a draw bar 406 which is axially affixed to expander 404 such that expander 404 is axially displaced in response to axial displacement of the draw bar 406. As described below, the axially fixed position of draw bar 406 relative to expander 404 is adjustable. The disk clamping collet system 400 further comprises a spindle 408. Collet 402 is axially affixed with respect to spindle 408. Draw bar 406 and expander 404 are jointly axially movable along the z-axis relative to collet 402 and spindle 408.

The entire disk clamping collet system 400 rotates around the z-axis. Rotary driving means are attached to disk clamping collet system 400 to drive this rotation. These driving means are not shown in FIG. 5 and are beyond the scope of present disclosure.

In the embodiment of the invention presently being described, draw bar 406 comprises an abutting end 440. The disk clamping collet system 400 further comprises a first static abutment 442 which is axially fixed with respect to collet 402. The disk clamping collet system 400 further comprises a coiled spring 410 which lies between abutting end 440 of draw bar 406 and first static abutment 442. By contact with abutting end 440, coiled spring 410 urges draw bar 406 in a direction corresponding to an inward compressive movement of expander 404 into collet 402 toward collet base 412. As a result, expansion surface 436 of expander 404 is urged into contact with expansion portion 424 of collet 402.

The disk clamping collet system 400 further comprises a second static abutment 444 which is axially affixed with respect to collet 402. The spring constant of coiled spring 410 is chosen to exert a force on abutting end (stop) 440 such that the inward axial force on expander 404 exceeds the opposite, i.e. outward, axial force exerted on expander 404 by fingers 414a–f during disk clamping collet system operation. As a result, coiled spring 410 urges the abutting end 440 of draw bar 406 away from first static abutment 442 until abutting end 440 is abuttably stopped by second static abutment 444. In the present embodiment, in operation, when abutting end 440 is abutted against the second static abutment 444, the second static abutment 444 provides an axial reference from which expander 404 is positioned at a predetermined nominal axial biasing position relative to collet 402. When the expander 404 is positioned in this predetermined nominal axial biasing position, and a mounted disk of nominal inner diameter is mounted on collet 402, the disk is ready for texturizing rotation. It is noted that second static abutment 444 also inherently serves the function of preventing overexpansion of the collet fingers 414a–f which could lead to damage of the collet 402.

Figure 1:
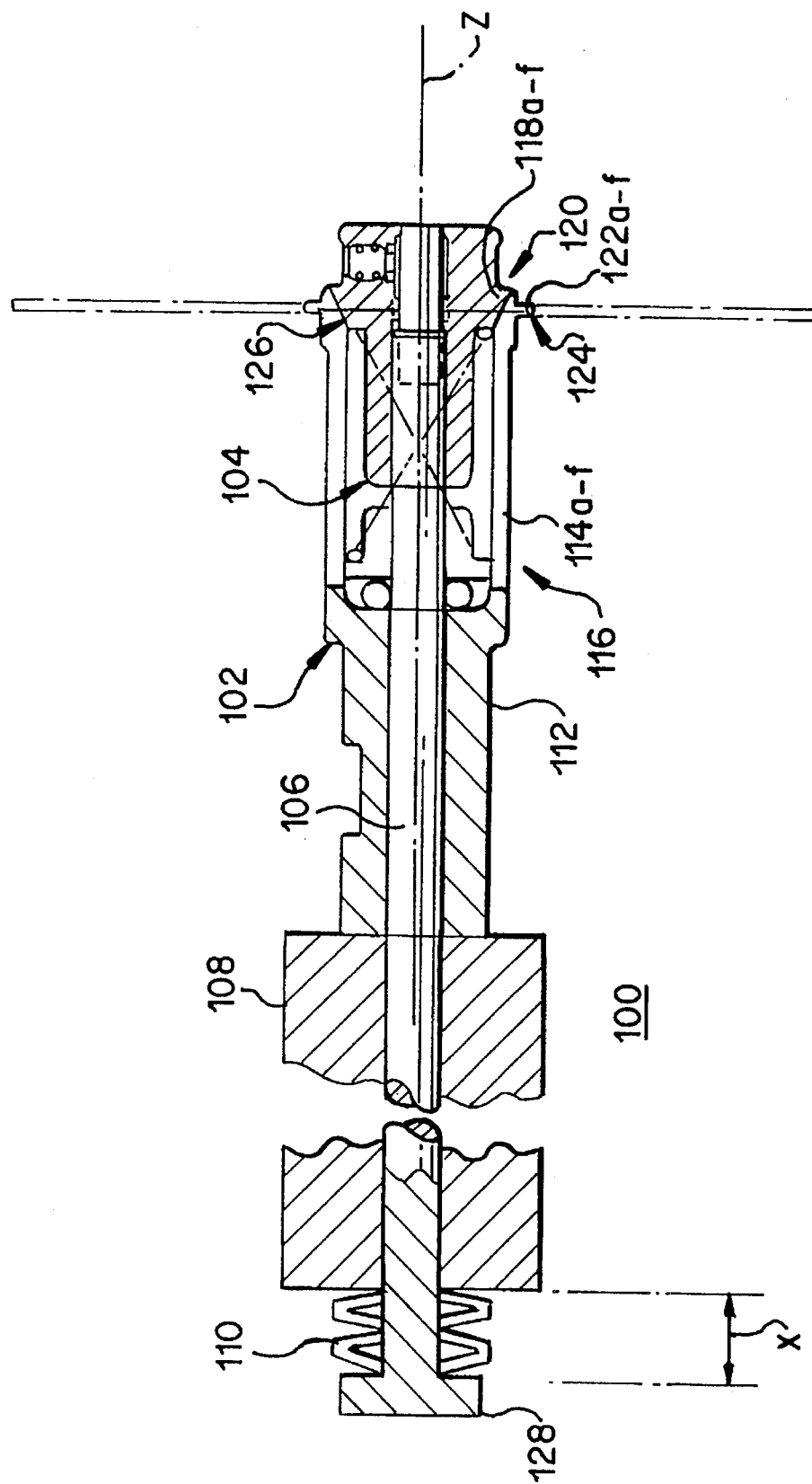
FIG. 1 represents a side view of a disk clamping collet system according to the prior art.

Coiled spring 410 allows for a relatively high displacement range as compared to the belville springs used in the prior art device of FIG. 1. For example, where a typical prior art device had an axial displacement range of about 1/32 inches, the coiled spring 410 in a collet system according to the present invention allows the draw bar 406 to have a typical stroke length of approximately 1/8 inches.

Disk clamping collet system 400 further comprises a means for adjusting the predetermined nominal axial biasing position of expander 404 relative to collet 402. This means for adjusting 448 and 446 adjusts the axial position of expander 404 along the draw bar 406.

As shown in FIG. 5, in a disk clamping collet system 400 according to the first embodiment of the present invention, the adjustment means for adjusting the predetermined nominal axial biasing position comprises a threaded end 446 and a nut 448 threadably engaged thereto. Nut 448 is coupled to expander 404 such that nut 448 and expander 404 are axially affixed with respect to each other. In operation, abutting end 440 and nut 448 are rotated into positions such that, when the abutting end 440 of draw bar 406 is in abutted contact with second static abutment 444, the expander 404 will be at the predetermined nominal axial biasing position relative to collet 402.

As mentioned above, the coiled spring 410 allows for a relatively high displacement range of expander 404 as compared to the prior art. It is noted that the expansion portion 424 of collet 402, along with convex expansion surface 436 of expander 404, may thereupon possess a more gradual or shallow slope relative to the z-axis to correspond to this greater axial displacement capability. Such shallower slopes, in turn, may provide for a finer, more adjustable relationship between the axial displacement of the expander 404 and the outward radial pressure exerted in the inner surface of a mounted disk.

In contrast to prior art devices, a disk clamping collet system according to the present invention comprises a means, mentioned above in terms of second static abutment 444 and abutting end 440, of stopping axial movement of expander 404 into collet 402 via an axial mechanical abutment. This is in contrast to a simple reliance on an axial equilibrium between a spring force and an opposite collet finger pressure, as in the prior art. One of the many advantages of a collet system in accordance with the present invention is that, because there is no reliance on an axial spring equilibrium, deviations in the spring characteristics of the coiled spring from its nominal characteristics do not affect the overall operational characteristics of the collet system. Furthermore, the use of a fixed distance from a fixed point to establish the nominal axial biasing position of the expander relative to the collet makes the present invention less susceptible to debris and functional degradation than prior art collet systems.

To achieve mounting, holding, and rotation of a rigid disk substrate of a known nominal inner diameter with a desired predetermined, repeatable outward radial force, nut 448 and abutting end 440 are positioned along threaded end 446 of draw bar 406, respectively, until an optimal positioning of expander 404 relative to draw bar 406 is achieved for that inner diameter and desired outward radial force. At this optimal positioning of draw bar 406 relative to expander 404, expander 404 will be in the predetermined nominal axial biasing position when abutting end 440 of draw bar 406 is in abutted contact with second static abutment 444.

After the optimal positioning of expander 404 relative to draw bar 406 is achieved, the collet system 400 is in an operable state. In operation, during disk unloading and loading, abutting end 440 of draw bar 406 is axially forced toward collet 402 by an external means such as an air cylinder assembly, shown as element 450 in FIG. 5, thereby compressing coil spring 410. FIG. 5 represents disk clamping collet system 400 in this state. Expander 404 is thrust outward with respect to collet base 412 and the outward radial force exerted by convex expansion surface 436 on fingers 414a–f is thereby removed. The cantilever spring force experienced by finger extensions 426a–f is thereby removed, in turn removing the outward radial force which disk contact ring 432 exerts on the inner surface of the mounted disk. The mounted disk can then be removed and the next disk can be mounted over the contact ring 432.

Figure 8:
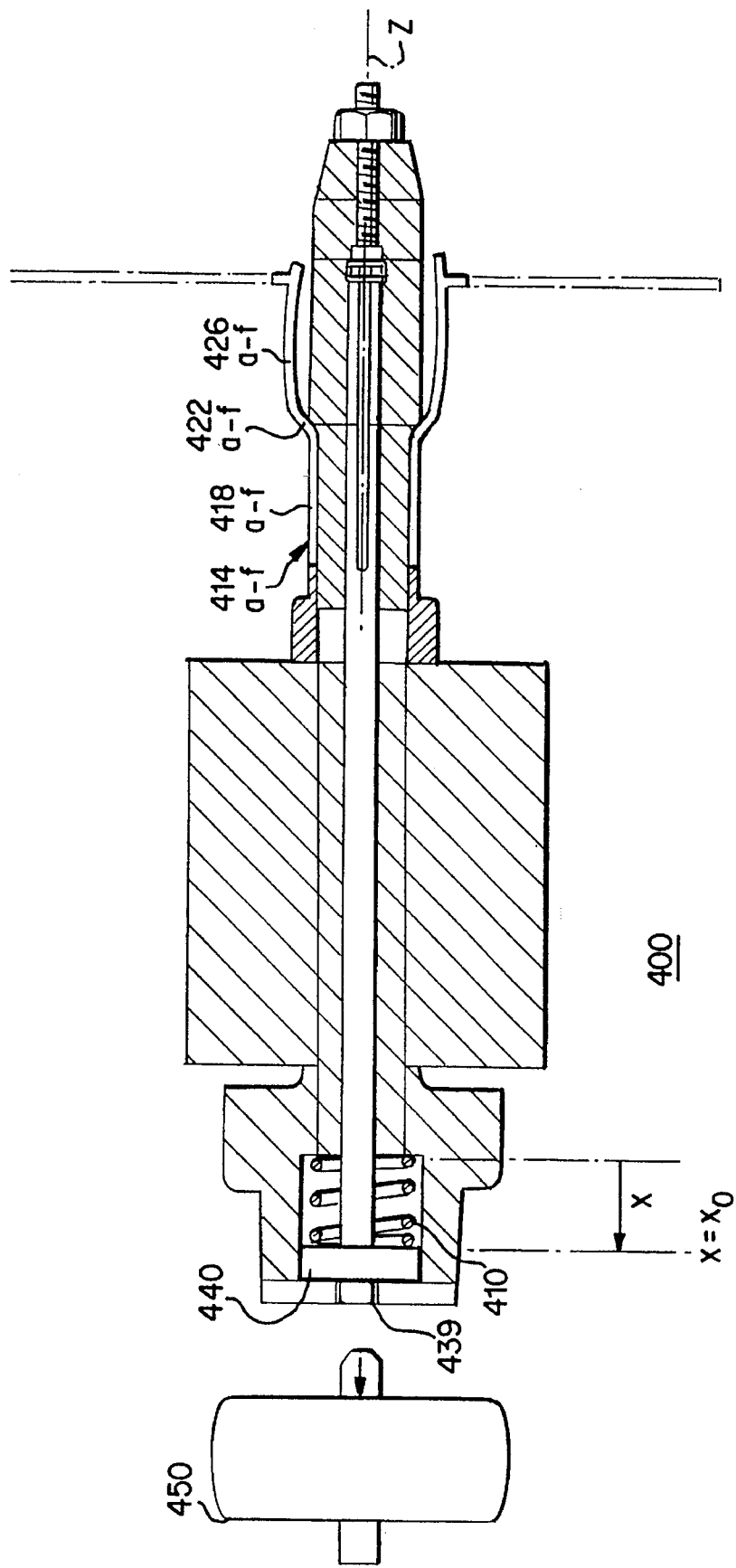
FIG. 8 is a cross sectional illustration of the disk clamping collet system according to the first embodiment of the present invention, the collet fingers being in an expanded state and radially clamping a disk.

After the mounting of the next disk, the external force on abutting end 440 is released and the disk is clamped into place by operation of the coiled spring 410 urging expander 404 into the predetermined nominal axial biasing position, thereby urging disk contact ring 432 into radial contact with the inner surface of the disk. This state is shown in FIG. 8. It is noted that FIG. 8 is an exaggerated illustration, for purposes of clarity of explanation and understanding of the invention, and is not drawn to scale with respect to the cantilever deflections of fingers 414a–f.

It is important to note that the outward radial force exerted by disk mounting contact ring 432 is not determined by the spring constant of coil spring 410. As described above, the spring force is large enough to overcome the axial force exerted on the expander 404 by the fingers 414a–f, thereby urging abutting end 440 against second static abutment 444. This outward radial force depends upon (1) the adjustment of abutting end 440 and nut 448 in adjusting the offset of expander 404 relative to draw bar 406, and (2) the cantilever spring characteristics exhibited by fingers 414a–f when expander 404 is in the predetermined nominal axial biasing position. This results in a dramatic improvement in the consistency and repeatability of this outward radial force, as well as tolerance to debris and to frictional variations between expander 404 and collet 402.

Figure 4:
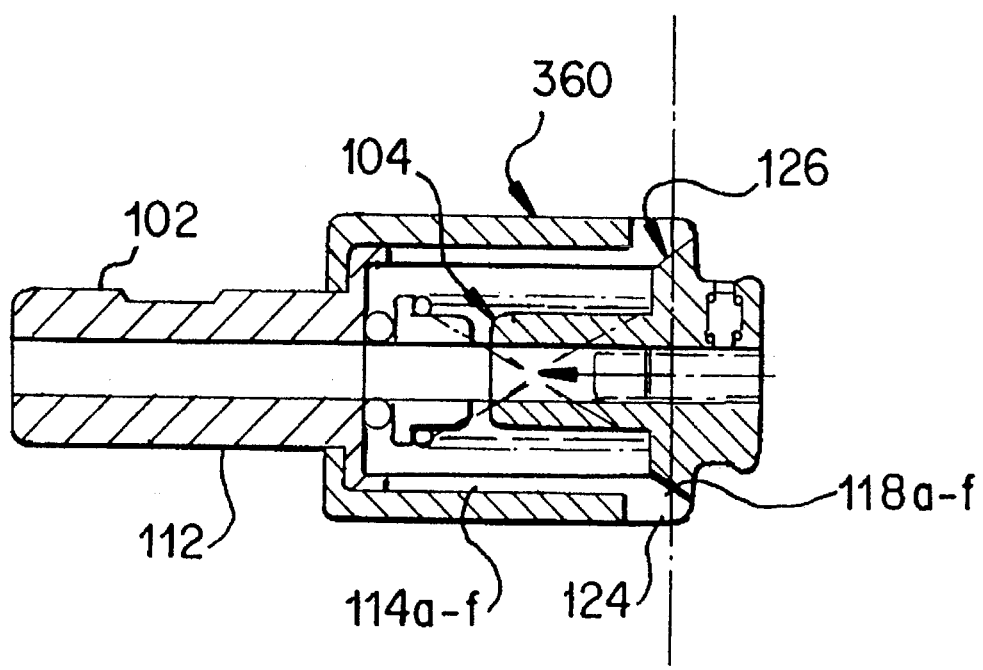
FIG. 4 shows a disk clamping collet system according to the prior art, as modified to employ a position-limiting collar.
Figure 9:
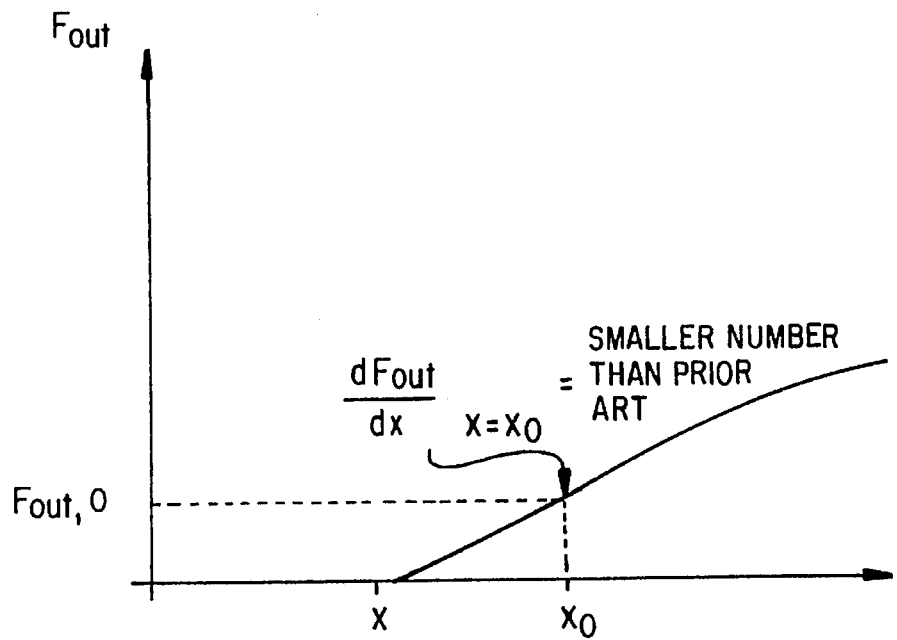
FIG. 9 is a graph of the outward radial force $F_{out}$ exerted on an inner surface of a mounted disk versus the axial position x of the expander relative to the collet, in a disk clamping collet system according to the present invention.

FIG. 9 illustrates this dramatic improvement. FIG. 9 plots the outward force characteristic $F_{out}$ exerted by one of disk contact ring segments 430a–f of the fingers 414a–f (e.g., disk mounting contact ring segment 432a of finger 414a) against a portion of the inner circumference of a disk which has been placed over disk contact ring 432. This force $F_{out}$, shown on the vertical axis, is plotted against the displacement x of the abutting end 440 of draw bar 406 with respect to a fixed point on the spindle 408, as shown in FIGS. 4 and 4B.

When the disk is initially placed over disk contact ring 432, finger 414a is retracted and there is initially no force exerted on the inner surface of the mounted disk. As expander 404 is further inserted and urged against collet 402, a point $x_c$ is reached where initial contact is made between disk contact ring segment 432a and part of the inner surface of the mounted disk. As the expander 404 is further drawn into collet 402 by force of the coiled spring 410, the outward force $F_{out}$ increases, but unlike the prior art collet systems, this force increases in a tolerant and controlled fashion with respect to changes x. This characteristic, of course, is due to the cantilever spring action of the extension portion 426a of fingers 414a. This force is increased until the point $x_o$ is reached, which corresponds to the abutment of abutting end 440 against static abutment 460. This results in a nominal outward clamping force $F_{out,o}$.

Figure 2:
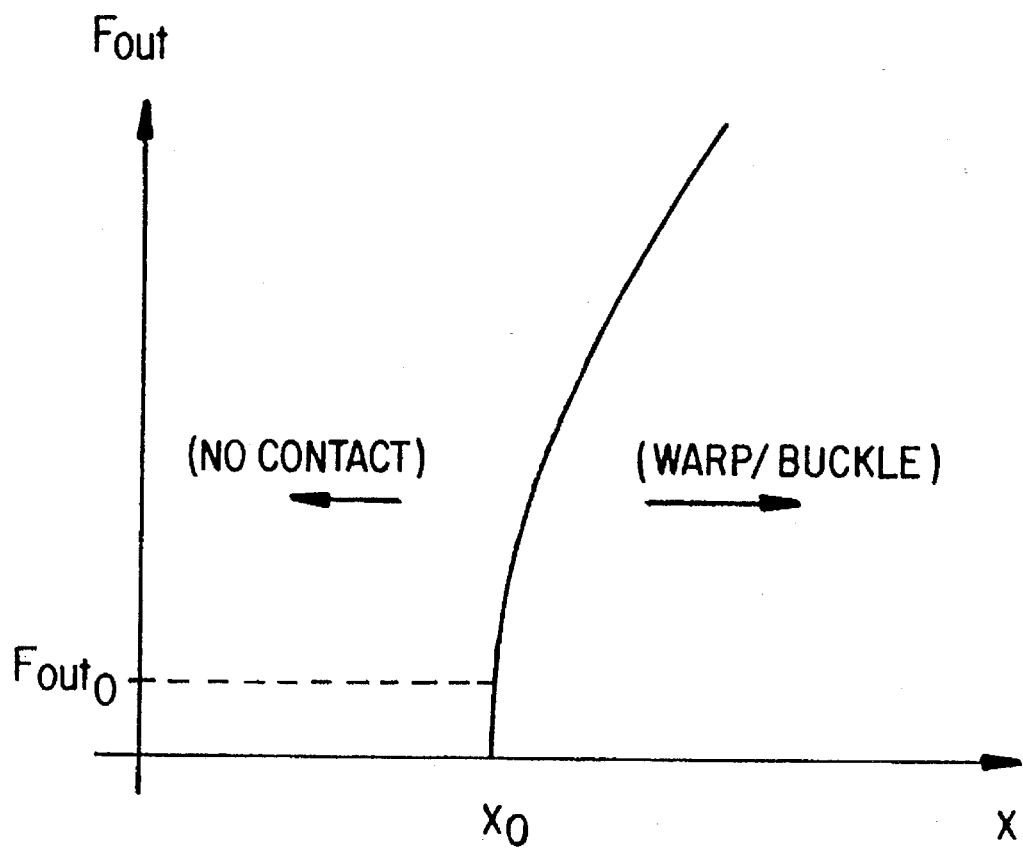
FIG. 2 is a graph of the outward radial force $F_{out}$ exerted on an inner surface of a mounted disk versus the axial position x of the expander relative to the collet, in a disk clamping collet system according to the prior art.

As seen by comparing FIG. 9 with FIG. 2, the rate of change of $F_{out}$ compared to x at $x=x_o$ (i.e. $dF_{out}/dx|x=x_o$) is a much smaller number for the disk clamping collet system 400 according to the present invention than for the prior art collet system 100. Thus, $F_{out}$ is highly tolerant to changes in x, in that small changes in x will likewise result in small and predictable changes in $F_{out}$.

Figure 10D:
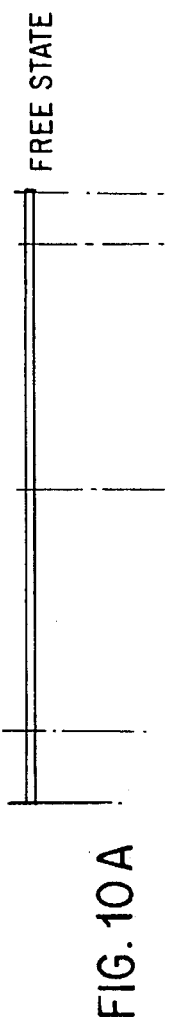
FIG. 10(d) shows a close up side view of the disk clamping collet system according to the first embodiment of the present invention.
Figure 10D:
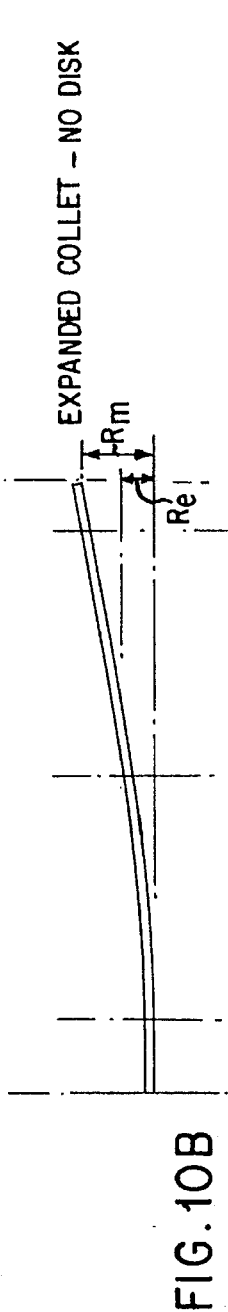
Figure 10D:
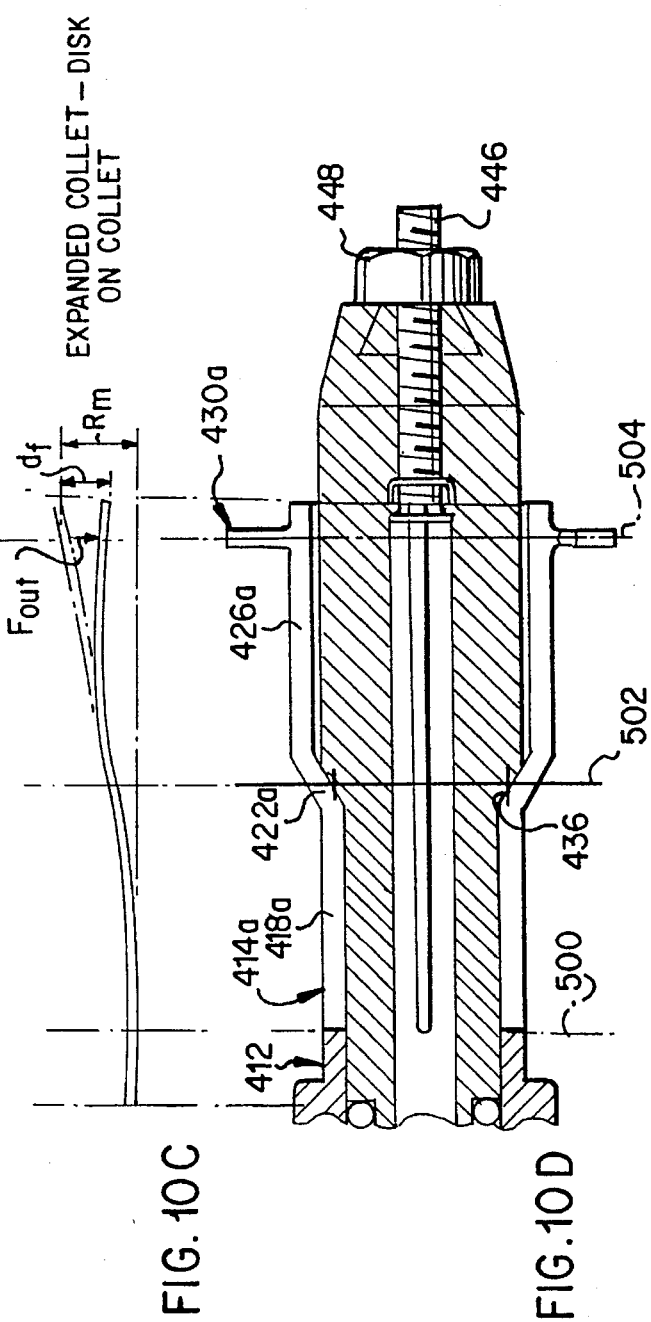

FIG. 10 illustrates the factors behind the tolerant relationship between x and $F_{out}$. FIG. 10(d) represents a close-up cut away diagram of disk clamping collet system 400 in the region of the collet fingers 414a–f. In FIG. 10(d), finger 414a is shown at the top of the diagram. FIG. 10(d) shows a plane 500 at the intersection of finger base 418a and base 412. FIG. 10(d) also shows a plane 502 in the region of convex expansion surface 436. Plane 502 generally corresponds to the radial expansion contact locus between expander 404 and collet 402, although this locus may contain points outside the plane 502 as well, e.g. when the locus is a cone-shaped annular region.

Due to an averaging effect where the locus is a cone-shaped annular region, however, the cantilever behavior of finger 414a may permissibly be analyzed as if all contact between convex expansion surface 436 and expansion portion 422a were made in a plane. Therefore, for purposes of clarity of explanation, plane 502 will be referred to as the radial expansion contact locus plane 502.

FIGS. 10(a–c) show an exaggerated diagram of the cantilever spring tension experienced by finger 414a in response to the outward radial pressure exerted by expander 404 on the expansion portion 422a as well as the downward force exerted by a mounted disk on disk contact ring segment 430a. So as not to cloud the features of the present invention, cantilever finger 414a is represented by a straight cantilever in FIGS. 10(a–c), excluding the bent portions corresponding to expansion portion 422a.

Cantilever finger 414a experiences external forces at three different locations along the longitudinal dimension. The first point is where the base portion 418a of finger 414a contacts the collet base portion 412, shown at plane 500 in FIG. 10(d). Finger 414a is capable of deflection beginning at this point. The second contact point, as previously described, is at the radial expansion contact locus plane 502. The third contact point is along the surface of disk contact ring segment 430a, which is placed along a plane identified as plane 504 in FIG. 10(d).

FIG. 10(a) illustrates the cantilever finger in a free state. FIG. 10(b) illustrates the cantilever finger experiencing a upward force at radial expansion contact locus plane 502 by the expander 404, but without a mounted disk. As shown, the cantilever finger experiences a cantilever deflection between points corresponding to the plane 500 and to the radial expansion contact locus plane 502, where the radius is $R_e$. After this point, that is, between radial expansion contact locus plane 502 and plane 504, the cantilever finger experiences no deflection and is straight, extending outward to a radius of $R_m$ at plane 504.

FIG. 10(c) shows a cantilever finger as in operation with an inserted expander 404 as well as a mounted disk, the expander 404 being located at the predetermined nominal axial biasing position. At radial expansion contact locus plane 502, the cantilever finger is still extended to a distance of $R_e$. However, as shown in FIG. 10(c), extension portion 426a of finger 414 is deflected inward in a cantilever spring fashion between radial expansion contact locus plane 502 and plane 504. A force $F_{out}$ is exerted downward on the finger 414a at the disk contact ring segment 430a, and this same force is likewise radially exerted against the inner surface of the disk in an equal and opposite reaction.

The difference between the distance $R_m$ and the position of the disk contact ring segment in FIG. 10(c) is denoted by the distance $d_f$. To an approximation, the force $F_{out}$ changes linearly with changes in the distance $d_f$, the relationship being such that the change is $F_{out}$ is equal to a cantilever spring constant K times a change in $d_f$. The spring constant K, in turn, is a function of the characteristics of the material used for the collet 402, as well as the distance between radial expansion contact locus plane 502 and plane 504. The spring constant K will also depend on the distance between plane 500 and radial expansion contact locus plane 502.

The spring constant K will decrease as the distance between radial contact locus plane 502 and plane 504 is increased. The spring constant K will also decrease if a more flexible material is used for finger 414a, or if the finger 414a is thinner. These parameters may be adjusted to adjust K to a designed value corresponding to a desired degree of tolerance of $F_{out}$ to changes in $d_f$.

Referring to the tolerant relationship of $F_{out}$ versus x near $x_o$ in FIG. 9, this desired relationship is a result of (1) the approximately linear relationship between the vertical displacement $R_m$ of the disk contact ring segment 430a and the axial displacement x when the collet is unloaded, (2) the resulting linear relationship between the axial displacement x and the cantilever displacement $d_f$ for a disk of a nominal inside diameter, and (3) the above-mentioned tolerant relationship between the cantilever spring force $F_{out}$ and the displacement $d_f$. Combining these, there is a tolerant relationship between the outward force $F_{out}$ and the axial displacement x.

It is to be appreciated that the axial displacement of expander 404 with respect to collet 402 at the bias operating point is dictated by the positioning of nut 448 with respect to threaded end 446. This characteristic, in conjunction with the tolerant, predictable relationship between $F_{out}$ and x, makes it easily seen that the outward force $F_{out}$ is highly fine tunable as well as highly repeatable among disks.

It is to be further appreciated that the abuttable stopping of abutting end 440 against second static abutment 444, together with the high spring force of coiled spring 410, further makes the system robust against frictional variations between the expander 404 and the collet 402. In the prior art, the operative "holding" point of the system is dependent on an axial equilibrium between two counteracting forces, the spring force versus the opposite collet finger axial pressure, and this equilibrium is confounded due to frictional variations at the contact point between the expander and the collet fingers. These frictional variations may, for example, be due to the presence of free floating abrasives in the environment, or to the surface characteristics of the materials used for the expander and the collet. In contrast, in the present invention there is no dependence on this sensitive axial equilibrium. Rather, coiled spring 410 forces abutting end 440 against second static abutment 444 with a force greater than the opposite force exerted by the fingers 414a–f. Slight changes in the opposite axial force exerted on expander 404 due to frictional variations will be of no consequence—the expander 404 will continue to be forcibly abutted against the same contact point at the predetermined nominal axial biasing position. This factor, in combination with the cantilever spring force characteristic of fingers 414a–f, provides for a highly robust, repeatable outward radial force on the inner surface of the disk.

FIG. 10, in conjunction with FIG. 9, also makes it apparent that the outward force $F_{out}$ is robust against small variations in the inner diameter of the mounted disks. As discussed above, around the predetermined nominal axial biasing point $x_o$, $F_{out}$ has a generally linear relationship with the distance $d_f$. A small change, therefore, in $d_f$ will thereupon bring only a small change $F_{out}$, as dictated by the cantilever spring constant K. This is in sharp contrast to the prior art of FIG. 1, in which case small differences in disk diameter would cause differing axial displacements of expander 104 with respect to collet 102. In turn, because of the unpredictable nature of the equilibrium point at the frictional contacts between expander 104 and collet 102, the outward force exerted on the disk could vary widely among disks of only slightly different diameters. In the present invention, these variations would be known because they would be dictated by the cantilever spring constant K, and would additionally be small.

It is to be further appreciated that a disk clamping collet system according to the present invention provides for easier mounting of the disk because of a greater clearance between the collet fingers 414a–f and the disk inner surface when the collet 402 is in an unexpanded state. Due to the cantilever effect implemented in the present invention, the dynamic range of motion of the disk contact ring segments 430a–f is inherently greater than in prior art devices. Thus, in an unexpanded state, the disk contact ring 432 will generally have a smaller radius around the axis of rotation than that of a prior art device in an unexpanded state. This allows greater clearance for automated loading and unloading of the disk.

Figure 11:
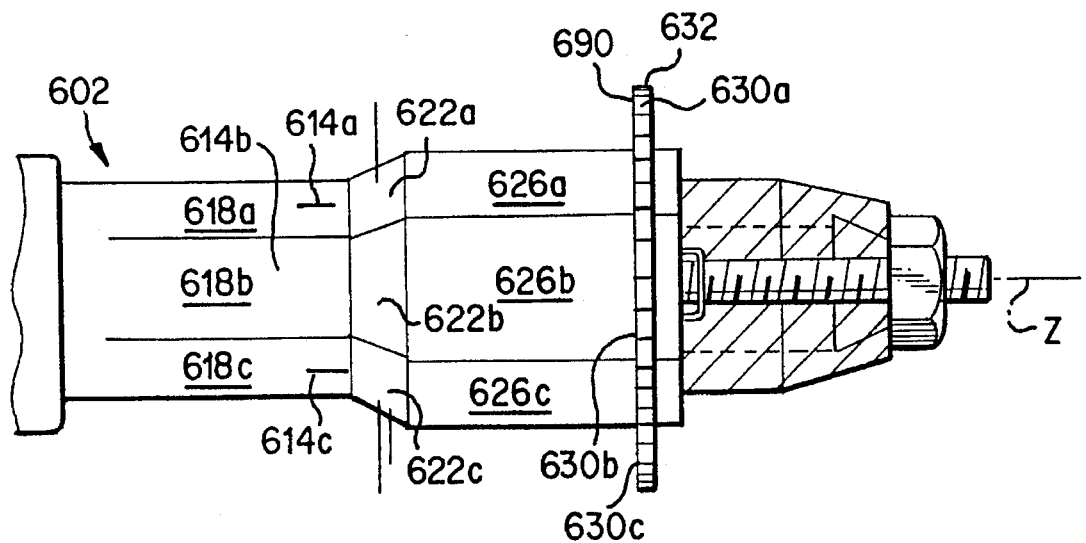
FIG. 11 is a side view of a disk clamping collet system according to a second embodiment of the present invention.

FIG. 11 illustrates a side view of a collet 610 of a disk clamping collet system 600 in accordance with a second embodiment of the present invention. FIG. 11 shows a collet 602 which comprises fingers 614a, 614b, 614c, 614d, 614e, and 614f. Each of fingers 614a–f in turn comprises components substantially identical to those of the collet fingers 414a–f in accordance with the first embodiment of the present invention as shown in FIG. 5. For example, finger 614a comprises a base portion 618a, an expansion portion 622a, an extension portion 626a, and a disk contact ring segment 630a. Disk contact ring segments 630a–f collectively form a disk contact ring 632, etc.

Collet 610 has been modified, however, in that disk contact ring segments 618a–f comprise a textured surface on the outer diameters, this textured surface being formed with grooves 690 running substantially parallel to the axis of rotation as shown in FIG. 11. The grooves 690 serve the function of providing an enhanced frictional contact between disk contact ring 632 and a mounted disk so as to enable increased rotational force. While it has been known in the art to use texturized surfaces for the disk contact ring segments 618a–f, it has been found that placement of these grooves across the clamping surface provides optimal rotational friction force on the disk, enabling this force to be increased while the outward radial clamping force $F_{out}$ remains the same. Thus, rotational force is enhanced while keeping magnitudes of disk warpage or bending low.

Figure 12A:
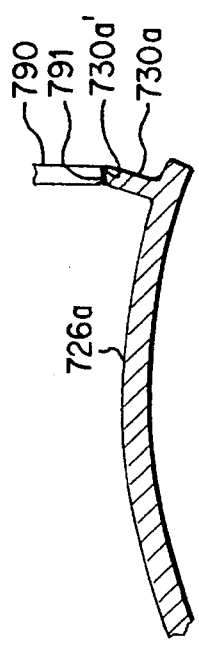
FIGS. 12(a–b) illustrate an exaggerated view of the cantilever behavior of a collet finger as it affects the orientation of a disk contact ring segment on the collet finger.
FIG. 12(c) shows a close up side view of a disk clamping collet system according to a third embodiment of the present invention.
Figure 12B:
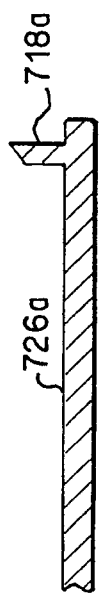
Figure 12C:
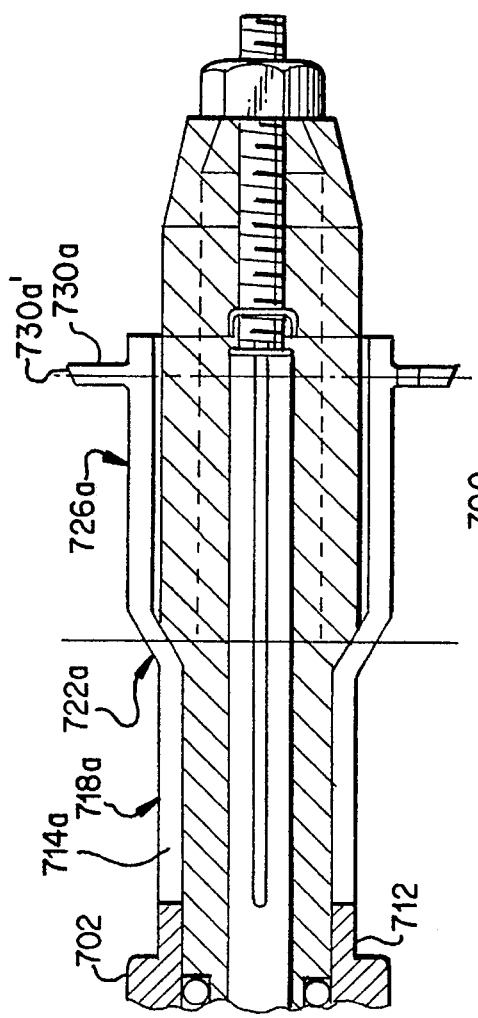

FIG. 12(c) illustrates an expanded side view of a collet 702 of a disk clamping collet system 700 in accordance with a third embodiment of the present invention. Collet 702 comprises a base portion 712 along with collet fingers 714a, 714b, 714c, 714d, 714e, and 714f. Collet finger 714a comprises base portion 718a, expansion portion 722a, extension portion 726a, and disk contact ring segment 730a. Collet 702 is substantially similar to the collet 402 of FIG. 5 with the exception that disk contact ring segments 730a–f comprise inward sloping surfaces 730a'–730f' which slope inward toward base portion 712, as shown in FIG. 12(c).

FIGS. 12(a and b) provide an exaggerated illustration of the beneficial effects of the inward sloping surfaces 730a'–730f'. FIG. 12(a) shows extension portion 726a of finger 714a when the collet 702 is in a nominal operating position with a mounted disk 790 mounted thereupon. Disk 790 contains an inner surface 791 which is substantially parallel to the axis of rotation. In the nominal operating position, extension portion 726a is in a substantially arched shape, in a concave arch facing the axis of rotation. By having the bevelled surface 730a to compensate for the arching of extension portion 726a such that in the nominal operating position surface 730a' is substantially parallel to the axis of rotation, a full surface contact is achieved with inner surface 791 of disk 790.

FIG. 12(b) shows the collet finger 714a in a relaxed position and shows how the surface 730a' is necessarily an inward bevel sloping toward base 712 of collet 702. Disk contact ring segments 730a–f may additionally contain grooves which are similar to the grooves 690 of FIG. 11. It is to be appreciated that the angles of the beveled surfaces 730a'–730f' are greatly exaggerated in FIG. 12 for clarity of explanation.

It is apparent that many modifications and variations of the present invention as set forth here may be made without departing from the spirit and scope thereof. For example, within the scope of the present invention would be a disk clamping collet system having a disk contact ring formed on the fingers between the base end and the free ends, with the distance between the expansion surface and the free ends being greater than the distance between the disk contact ring and the free ends. As with the previously discussed embodiments of the invention, such an arrangement could also result in a more consistently repeatable outward force on a mounted disk. In this example, however, the fingers become "beams" supported at either end by the base and by the expansion surface, respectively, the "beams" extending inward therebetween in a spring-like fashion upon which "bounce" the disk contact ring segments. Such an arrangement also reduces the overly sensitive dependency exhibited by prior art systems on the axial positioning of the expander relative to the collet. Such an arrangement is also within the scope of the present invention.

The specific embodiments described here and above are given by way of example only and the invention is limited only by the terms of the appended claims.

What is claimed is:

1. An improved disk clamping collet system for mounting, holding, and rotating a disk, said collet system comprising:

an expanding collet, said collet comprising a plurality of fingers, said collet further comprising a disk contact ring on said fingers for radially contacting an inner surface of the disk; and an expander for forcibly urging at a radial expansion contact locus said fingers to radially expand such that said disk contact ring expands to radially contact the inner surface of the disk;

wherein said disk contact ring is offset from the radial expansion contact locus a distance sufficient to cause said fingers to exert a cantilever-type spring force against the inner surface of the disk when said disk is mounted around said disk contact ring and when said expander is at an axial biasing position to ensure application of substantially uniform and repeatable outward forces to the disk regardless of minor surface variations along said radial expansion contact locus.

2. The disk clamping collet system according to claim 1:

wherein said collet comprises a base;

wherein said disk contact ring lies a first distance from said collet base;

wherein said radial expansion contact locus lies a second distance from said base; and wherein said first distance is greater than said second distance.

3. The disk clamping collet system according to claim 2, wherein said first distance exceeds said second distance by at least 0.50".

4. The disk clamping collet system according to claim 1, said collet system being rotatable around an axis of rotation, wherein said fingers are at an average radius R from the axis of rotation between said disk contact ring and said radial expansion contact locus, and wherein said disk contact ring and said radial expansion contact locus are separated by a distance which is greater than said average radius R of said fingers.

5. The disk clamping collet system according to claim 1, wherein said expander has a convexly shaped outer surface.

6. The disk clamping collet system according to claim 1:

wherein said collet comprises a base;

wherein said expander comprises an expansion surface for forcibly urging said collet fingers outward;

wherein said expansion surface comprises a narrowest portion and a widest portion;

wherein said disk contact ring lies a first distance from said base;

wherein said widest portion of said expansion surface lies a second distance from said base; and wherein said first distance is greater than said second distance.

7. The disk clamping collet system according to claim 1, said disk contact ring comprising an outer surface which is raised with respect to adjacent portions of said collet fingers.

8. The disk clamping collet system according to claim 1:

said collet system being rotatable around an axis of rotation; and said disk contact ring comprising an outer surface textured with grooves substantially parallel to the axis of rotation.

9. The disk clamping collet system according to claim 1:

said collet system being rotatable around an axis of rotation;

said collet comprising a base; and said disk contact ring comprising an outer surface which is bevelled with respect to the axis of rotation and sloping inward toward said base.

10. The disk clamping collet system according to claim 9, wherein said outer surface is bevelled so as to be substantially parallel to the inner surface of the disk when the disk is mounted and being held.

11. The disk clamping collet system according to claim 9, wherein said outer surface is textured with grooves substantially parallel to the axis of rotation.

12. The disk clamping collet system according to claim 1:

wherein said collet further comprises a base;

wherein each of said fingers has a fixed end affixed to said base and a free end near said disk contact ring; and wherein when said disk is mounted around said disk contact ring and when said expander is at said axial biasing position, the sole inward force on said fingers near said disk contact ring is provided by the inner surface of the disk.

13. The disk clamping collet system according to claim 12, wherein when said disk is mounted around said disk contact ring and when said expander is at said axial biasing position, said collet system contacts the disk only at said disk contact ring.

14. The disk clamping collet system according to claim 12, said collet system being rotatable around an axis of rotation, wherein:

said fingers are at an average radius R from the axis of rotation between said disk contact ring and said radial expansion contact locus; and wherein said disk contact ring and said radial expansion contact locus are separated by a distance which is greater than said average radius R of said fingers.

15. The disk clamping collet system according to claim 1, wherein said expander comprises an expansion surface for forcibly urging said collet fingers outward, wherein said expansion surface is convexly shaped.

16. A disk clamping collet system for mounting, holding, and rotating a disk, said collet system comprising:

an expanding collet, said collet comprising a plurality of fingers, said collet further comprising a disk contact ring on said fingers for radially contacting an inner surface of the disk, said collet further comprising a base, wherein the disk is mounted onto said disk clamping collet system from a direction opposite said base with respect to said disk contact ring; and an expander for forcibly urging at a radial expansion contact locus said fingers to expand such that said disk contact ring radially contacts the inner surface of the disk, said expander comprising a mounting cone which tapers away from said base in said opposite direction, whereby the disk is capable of being mounted onto said collet system more easily from said opposite direction due to corrective responses enabled by said mounting cone;

wherein said disk contact ring is offset from said radial expansion contact locus a distance sufficient to ensure substantially uniform and repeatable outward forces on the inner surface of the disk regardless of minor surface variations along said radial expansion contact locus.

17. A disk clamping collet system for mounting, holding, and rotating a disk, said system comprising:

an expanding collet, said collet comprising a plurality of fingers, said collet further comprising a disk contact ring on said fingers for radially contacting an inner surface of the disk, said collet having a base;

an expander for forcibly urging at a radial expansion contact locus said fingers to radially expand such that said disk contact ring expands to radially contact the inner surface of the disk, wherein said expander achieves the radial urging of said fingers by an inward axial movement of said expander toward said base;

means for axially urging said expander inward toward said base; and means for abuttably stopping the inward motion of said expander toward said base at an axial biasing position;

wherein said disk contact ring is offset from the radial expansion contact locus a distance sufficient to cause said fingers to exert a cantilever-type spring force against the inner surface of the disk when said disk is mounted around said disk contact ring and when said expander is at said axial biasing position to ensure substantially uniform and repeatable outward forces on the inner surface of the disk regardless of minor surface variations along said radial expansion contact locus.

18. The disk clamping collet system according to claim 17, wherein said means for axially urging said expander urges said expander inward with a greater force than an outward force exerted on said expander by said fingers, whereby said expander is inwardly urged until abutment with said means for abuttably stopping.

19. The disk clamping collet system according to claim 17, further comprising means for adjusting said axial biasing position.

20. The disk clamping collet system according to claim 19, further comprising a draw bar axially affixed to said expander and said means for adjusting said axial biasing position comprising:

a nut threadably attached to said draw bar, said nut being axially affixed to said expander, whereby said axial biasing position is adjusted by rotating said nut.

21. The disk clamping collet system according to claim 17, said means for axially urging said expander comprising:

a draw bar axially affixed to said expander;

a draw bar abutment axially affixed to said draw bar;

a first static abutment axially affixed with respect to said base; and a spring means for springably urging said draw bar abutment away from said first static abutment.

22. The disk clamping collet system according to claim 21, said means for abuttably stopping said expander comprising:

a second static abutment located axially opposite said first static abutment with respect to said draw bar abutment, said second static abutment being axially fixed with respect to said base.

23. In a computer disk surface texturizing system, an improved disk clamping collet system for mounting, holding, and rotating a disk around an axis of rotation, said disk having an inner surface at an inner diameter for radial contact, said system comprising:

(a) an expanding collet comprising a collet base, a finger base, an expansion portion, and an extension portion, wherein said finger base, said expansion portion, and said extension portions are formed from radially curved cantilever fingers extending longitudinally from said collet base, wherein each of said fingers comprise base, expansion, and extension portions which collectively form said finger base, expansion, and extension portions, respectively, of said collet, and wherein each finger has a fixed end at said collet base and a free end opposite said collet base;

(b) an expander capable of axial motion with respect to said collet along the axis of rotation, said expander comprising an expansion surface for radially contacting an inner surface of said expansion portion of said collet at a locus of expander contact points, whereby said expansion portions of said collet fingers radially expand and separate responsive to an inward urging of said expander in a compressive axial direction toward said collet base;

(c) means for axially positioning said expander along said axis of rotation;

(d) a plurality of disk contact ring segments, one formed on each collet finger near said free end, said disk contact ring segments collectively forming a disk contact ring, said disk contact ring being for radially contacting the inner surface of the disk upon the radial expansion of said collet fingers, said disk contact ring being farther from said collet base than said locus of expander contact points by an offset distance; and (d) means, axially affixed with respect to said collet base, for abuttably stopping said expander at a predetermined nominal axial biasing position relative to said collet, whereby an outward radial pressure is exerted on a mounted disk's inner surface by said contact ring upon placement of the disk around said contact ring and upon a positioning of said expander at said nominal axial biasing position, said outward radial pressure being primarily a function of a cantilever spring force developed by each finger as said finger contacts (1) said base at said fixed end, (2) said expander expansion surface at said expanding portion, and (3) said disk inner surface by means of said disk contact ring segment near said free end;

said offset distance being sufficient to enable said cantilever spring force to ensure substantially uniform and repeatable outward forces on the inner surface of the disk regardless of minor surface variations along said locus of expander contact points.

24. The disk clamping collet system according to claim 23, said expansion surface having a narrow end and a wide end, wherein said disk contact ring is located in a plane distal from the plane of said wide end toward said free end of said collet.

25. The disk clamping collet system according to claim 23, said means for axially positioning said expander comprising:
   a draw bar longitudinally affixed to said expander and extending therethrough near a first end;
   a draw bar abutment longitudinally affixed to said draw bar near a second end;
   a first static abutment longitudinally affixed with respect to said collet; and
   a compression spring interposed between said first static abutment and said draw bar abutment, whereby when said spring is compressed, a compressive axial force is exerted on said draw bar urging said expander in said compressive axial direction toward said collet base.

26. The disk clamping collet system according to claim 25, said means for abuttably stopping said expander at a predetermined nominal axial biasing position comprising:
   a second static abutment longitudinally affixed with respect to said collet, said second static abutment being placed such that said draw bar abutment is interposed between said first and second static abutments, whereby said axial force caused by said spring urges said draw bar abutment toward said second static abutment; and
   means for adjusting said longitudinal affixation of said expander with respect to said draw bar, such that said expander is at said predetermined nominal axial biasing position upon the contact of said draw bar abutment with said second static abutment.

27. The disk clamping collet system according to claim 26, said means for adjusting said longitudinal affixation of said expander with respect to said draw bar comprising:
   a nut which is longitudinally affixed with respect to said expander, said nut being threadably engaged to said draw bar.

28. The disk clamping collet system according to claim 23, said disk contact ring comprising an outer surface which is raised with respect to the adjacent exterior of said extending portion of said collet.

29. The disk clamping collet system according to claim 23, wherein said contact ring comprises a textured outer surface, said textured surface being formed with grooves which run substantially parallel to said axis of rotation.

30. The disk clamping collet system according to claim 23, said disk contact ring comprising an outer surface bevelled and sloping downward toward said collet base, whereby when the disk is mounted and when said expander is in said predetermined nominal axial biasing position, said outer surface is substantially parallel flush with the inner surface of the disk.

31. An improved disk clamping collet system for mounting, holding, and rotating a disk, said collet system comprising:
   an expanding collet, said collet comprising a plurality of fingers, said collet further comprising a disk contact ring on said fingers for radially contacting an inner surface of the disk;
   an expander for forcibly urging at a radial expansion contact locus said fingers to radially expand such that said disk contact ring expands to radially contact the inner surface of the disk;
   wherein said expander has a convexly curved surface for forcibly urging said collet fingers outward; and
   wherein said disk contact ring and said radial expansion contact locus are separated by a distance sufficient to ensure substantially uniform and repeatable outward forces on the inner surface of the disk regardless of minor surface variations along said radial expansion contact locus.

32. The disk clamping collet system according to claim 31, wherein said distance is at least 0.50".

33. The disk clamping collet system according to claim 31,
   said collet system being rotatable around an axis of rotation,
   wherein said fingers are of an average radius from said axis of rotation between said disk contact ring and said radial expansion contact locus; and
   wherein said disk contact ring and said radial expansion contact locus are separated by a distance which is greater than said average radius of said fingers.

34. An improved disk clamping collet system for mounting, holding, and rotating a disk around an axis of rotation, said collet system comprising:
   an expanding collet, said collet comprising a base and a plurality of fingers, said collet further comprising a disk contact ring on said fingers for radially contacting an inner surface of the disk;
   an expander for forcibly urging at a radial expansion contact locus said fingers to radially expand such that said disk contact ring expands to radially contact the inner surface of the disk;
   wherein said disk contact ring comprises an outer surface which is bevelled with respect to the axis of rotation and sloping inward toward said base, and
   wherein said disk contact ring is offset from the radial expansion contact locus.

35. The disk clamping collet system according to claim 34, wherein said outer surface is bevelled so as to be substantially parallel to the inner surface of the disk when the disk is mounted and being held.

36. The disk clamping collet system according to claim 34, wherein said outer surface is textured with grooves substantially parallel to the axis of rotation.

37. In a computer disk surface texturizing system, an improved disk clamping collet system for mounting, holding, and rotating a disk around an axis of rotation, said disk having an inner surface at an inner diameter for radial contact, said system comprising:
   (a) an expanding collet comprising a collet base, a finger base, an expansion portion, and an extension portion, wherein said finger base, said expansion portion, and said extension portions are formed from radially curved cantilever fingers extending longitudinally from said collet base, wherein each of said fingers comprises base, expansion, and extension portions which collectively form said finger base, expansion, and extension portions, respectively, of said collet, and wherein each finger has a fixed end at said collet base and a free end opposite said collet base;
   (b) an expander capable of axial motion with respect to said collet along the axis of rotation, said expander comprising an expansion surface for radially contacting an inner surface of said expansion portion of said collet at a locus of expander contact points, whereby said expansion portions of said collet fingers radially expand and separate responsive to an inward urging of said expander in a compressive axial direction toward said collet base;

(c) means for axially positioning said expander along said axis of rotation;

(d) a plurality of disk contact ring segments, one formed on each collet finger near said free end, said disk contact ring segments collectively forming a disk contact ring, said disk contact ring being for radially contacting the inner surface of the disk upon the radial expansion of said collet fingers, said disk contact ring being in a plane which is farther from said collet base than the plane of said locus of expander contact points; and (d) means, axially affixed with respect to said collet base, for abuttably stopping said expander at a predetermined nominal axial biasing position relative to said collet, whereby an outward radial pressure is exerted on a mounted disk's inner surface by said contact ring upon placement of the disk around said contact ring and upon a positioning of said expander at said nominal axial biasing position, said outward radial pressure being primarily a function of a cantilever spring force developed by each finger as said finger contacts (1) said base at said fixed end, (2) said expander expansion surface at said expanding portion, and (3) said disk inner surface by means of said disk contact ring segment near said free end, wherein said disk contact ring comprises an outer surface bevelled and sloping downward toward said collet base, whereby when the disk is mounted and when said expander is in said predetermined nominal axial biasing position, said outer surface is substantially flush with the inner surface of the disk.

38. A disk clamping collet system for mounting, holding, and rotating a disk, said collet system comprising:

an expanding collet, including a base portion and a plurality of fingers extending a predetermined length from the base portion arranged for unrestrained cantilevered expansion, said fingers having a disk contact portion opposite the base portion for radially contacting an inner surface of the disk; and an expander disposed within said collet and acting on the fingers at a radial expansion contact locus to forcibly urge said fingers to radially expand such that said disk contact portion expands to radially contact the inner surface of the disk and exert an outward force thereon;

wherein the predetermined length of the fingers is sufficient to offset said disk contact portion from the radial expansion contact locus by an offset distance sufficient to ensure substantially uniform and repeatable outward forces around said disk contact portion regardless of minor surface variations along said radial expansion contact locus.

39. The system according to claim 38, wherein the offset distance defines a tolerant relationship between said outward force and the axial displacement of said expander, said tolerant relationship being characterized in that said outward force has an approximately linear dependence on the axial displacement of said expander over small axial displacements in the operating range.

40. The system according to claim 39, wherein said offset distance exceeds about 0.50".

41. The improved disk clamping collet system according to claim 38, said collet system being rotatable around an axis of rotation, wherein said fingers are capable of experiencing a deflection when said disk is mounted around said disk contact ring and when said expander is placed at an axial biasing position, said deflection being characterized in that at least a portion of said fingers is substantially parallel to said axis of rotation at a location which is on the same side of said radial expansion contact locus as the mounted disk.

42. The improved disk clamping collet system according to claim 38, wherein said expander comprises an expansion surface for forcibly urging said collet fingers outward, wherein said expansion surface is convexly shaped.

43. The improved disk clamping collet system according to claim 38, said collet system being rotatable around an axis of rotation, wherein said disk contact ring comprises an outer surface which is bevelled with respect to the axis of rotation and sloping inward toward said base portion.

44. The improved disk clamping collet system according to claim 43, wherein said outer surface is bevelled so as to be substantially parallel to the inner surface of the disk when the disk is mounted and being held.

* * * * *